United States Patent
Kambhatla et al.

(10) Patent No.: US 10,572,965 B2
(45) Date of Patent: Feb. 25, 2020

(54) DYNAMIC GRANULARITY ADJUSTMENT

(71) Applicant: Intel Corporation, Santa Clara, CA (US)

(72) Inventors: Srikanth Kambhatla, Portland, OR (US); Zhiming J. Zhuang, Sammamish, WA (US); Jun Jiang, Portland, OR (US)

(73) Assignee: Intel Corporation, Santa Clara, CA (US)

(*) Notice: Subject to any disclaimer, the term of this patent is extended or adjusted under 35 U.S.C. 154(b) by 0 days.

(21) Appl. No.: 15/394,898

(22) Filed: Dec. 30, 2016

(65) Prior Publication Data
US 2018/0190174 A1 Jul. 5, 2018

(51) Int. Cl.
*G06T 1/20* (2006.01)
*G09G 3/32* (2016.01)
*G09G 3/3208* (2016.01)

(52) U.S. Cl.
CPC ............ *G06T 1/20* (2013.01); *G09G 3/3208* (2013.01); *G09G 2320/0233* (2013.01); *G09G 2320/046* (2013.01)

(58) Field of Classification Search
CPC ......... G09G 3/2003; G09G 3/32–3291; G09G 5/10; G09G 2320/0204; G09G 2320/0233; G09G 2320/029; G09G 2320/0295; G09G 2320/043–048; G09G 2320/06; G09G 2320/0613; G09G 2320/062; G09G 2320/0686; G09G 2340/04–0428; G09G 2340/0464–0485; G09G 2360/16; G06T 1/20
See application file for complete search history.

(56) References Cited

U.S. PATENT DOCUMENTS

| | | | | |
|---|---|---|---|---|
| 6,552,735 B1* | 4/2003 | Dehmlow | ............ | G09G 3/3208 345/204 |
| 8,847,876 B2* | 9/2014 | Cho | ............... | G09G 3/3426 345/102 |
| 2006/0092108 A1* | 5/2006 | Ozaki | .............. | G09G 3/3208 345/76 |
| 2008/0252590 A1* | 10/2008 | Doi | .................. | G09G 3/342 345/102 |
| 2012/0005587 A1* | 1/2012 | Martin | ............. | G06F 3/1454 715/740 |
| 2013/0321361 A1* | 12/2013 | Lynch | ............. | G09G 3/3225 345/204 |
| 2014/0055505 A1* | 2/2014 | Ikeda | .............. | G09G 3/22 345/690 |
| 2016/0379550 A1 | 12/2016 | Jiang et al. | | |
| 2016/0379551 A1 | 12/2016 | Zhuang et al. | | |

OTHER PUBLICATIONS

U.S. Appl. No. 15/085,853, filed Mar. 30, 2016, Zhiming J. Zhuang.
U.S. Appl. No. 15/196,304, filed Jun. 29, 2016, Srikanth Kambhatla.

* cited by examiner

*Primary Examiner* — Nathan Danielsen
(74) *Attorney, Agent, or Firm* — International IP Law Group, P.L.L.C.

(57) ABSTRACT

Techniques for displaying content on an OLED display while decreasing the appearance of image sticking are provided. In an example, a computing system, includes an organic light-emitting diode (OLED) display and a memory to store pixel history values for blocks of pixels in the OLED display. A granularity selector determines a size for the blocks of pixels in the OLED display.

19 Claims, 12 Drawing Sheets

300

| ① Low | | ② Med | | ③ Low | |
|---|---|---|---|---|---|
| | | | | | |
| ④ Low | | ⑤ Low | | ⑥ Low | |
| | | | | | |
| ⑦ High | | ⑧ High | | ⑨ High | |
| | | | | | |

DYNAMIC GRANULARITY ADJUSTMENT

TECHNICAL FIELD

The present techniques relate generally to relate to the field of computing devices. More specifically the present techniques relate to generating content for display on organic light emitting diode (OLED) displays of computing devices based on pixel damage associated with such OLED displays.

BACKGROUND

One challenging issue of OLED technology is the degradation characterized by the loss of luminance over time due to cumulative usage or current driven through its emitting pixels. Because an OLED display typically comprise of thousands to millions self-emitting color pixels, the degradation rate among pixels are different due to un-even usage. Further, the degradation rate is different for each of the three primary colors of a pixel. For example, a blue sub-pixel degrades faster than red and green sub-pixels. Differences in degradation rate for pixels accumulates over time to cause undesirable effects such as color shift or burn-in, sometime also called image sticking. This is one of the key challenges that needs to be solved to enable wide adoption of OLED displays in many applications, such as personal computing, where many applications user interface graphics are susceptible to image sticking. To overcome this issue, compensation techniques can be applied to OLED to minimize or eliminate the burn-in or image sticking effect.

To compensate for the gradual loss of luminance that OLED displays experience over time, a common technique is to track the display sub-pixel operating history to figure out how much its luminance has degraded. Based on this pixel-history data, certain algorithms could be applied to generate correcting values to compensate for the degradation. Such values could then be input into another algorithm that determines the transformation that needs to be performed on each incoming sub-pixel in the frame buffer to counteract image stickiness. Such an image-transformation algorithm also consumes significant power and (depending on how it is implemented) could negatively impact overall system performance. Applying the algorithms at sub-pixel level consumes most memory, needs most power, but generates best quality. When these algorithms are applied at a larger granularity (e.g., a block of pixels), the solution consumes less power and reduces the per-frame processing time, but it reduces the quality of the image and negatively impacts long term effectiveness of the product. Such challenges could limit use of these techniques in product designs.

BRIEF DESCRIPTION OF THE DRAWINGS

The present invention will be understood more fully from the detailed description given below and from the accompanying drawings of various embodiments of the invention, which, however, should not be taken to limit the invention to the specific embodiments, but are for explanation and understanding only.

FIG. 4 is a drawing of a display indicating blocks that have a higher risk for image sticking versus blocks that have a lower risk of image sticking.

FIG. 5 is a drawing of the display of FIG. 4 that may occur after a period of operational time, showing the division of higher risk blocks into smaller blocks as history data is collected.

The same numbers are used throughout the disclosure and the figures to reference like components and features. Numbers in the 100 series refer to features originally found in FIG. 1; numbers in the 200 series refer to features originally found in FIG. 2; and so on.

DESCRIPTION OF THE EMBODIMENTS

Figure 1:
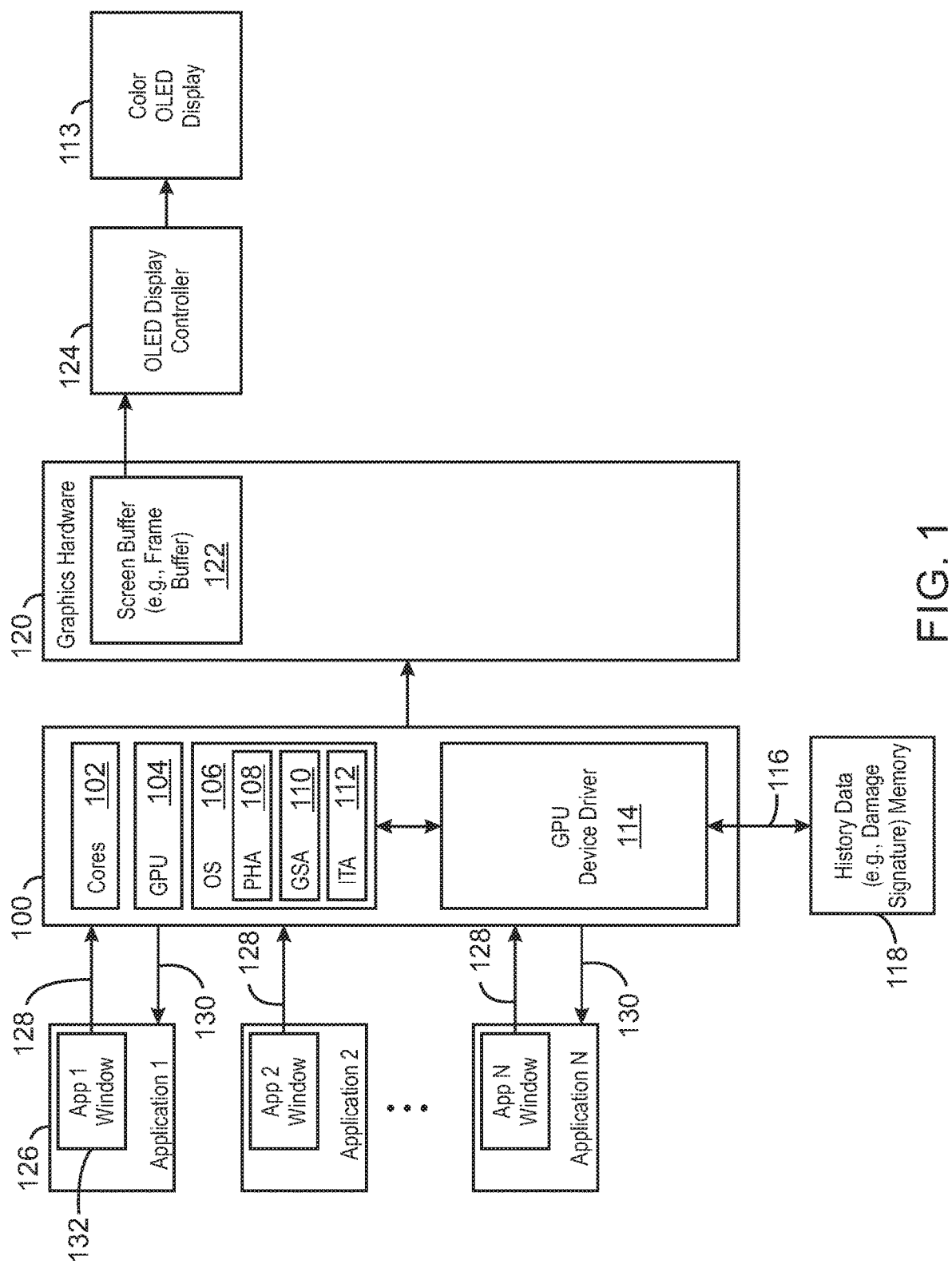
FIG. 1 is a block diagram of an example of a computing system displaying content based on history data.

In the following description, numerous details are set forth to provide a more thorough explanation of the present invention. It will be apparent, however, to one skilled in the art, that the present invention may be practiced without these specific details. In other instances, well-known structures and devices are shown in block diagram form, rather than in detail, in order to avoid obscuring the present invention.

Over the lifetime of an organic light emitting diode (OLED) display, relative usage differences, or wear patterns, start to appear between the adjacent areas of the display. The wear patterns, or damage, reflect usage patterns based on policy decisions inside the composition manager of an OS and the content managers within individual applications. The damage may be tracked by collecting pixel history data, which may include the time that a pixel is powered, the intensity of the pixel at that time, and the color of the pixel. By tracking these differences, and applying damage evaluation heuristics, display software components may alter the block sizes of the pixel history and the image transformation algorithms accordingly.

This disclosure describes a method that dynamically modulates the granularity of the pixel history that is collected and the granularity at which the image transformation algorithm operates. These changes in turn result in changes to the power consumption, memory footprint, and performance profiles of the algorithms for OLED compensation. The dynamic modulation may enable a balance between quality versus power and performance. For example, there may be little difference in the usage of a subpixel compared to a neighboring subpixel when the OLED display is relatively new. At that point, it may not be necessary to gather history at per pixel level. Instead, history data may be gathered at a higher granularity, such as at a larger pixel block level, which may reduce memory, power, and performance impacts on the system.

Techniques disclosed herein may dynamically adjust the granularity at which pixel history is tracked, and perform image transformation based on the analysis results for differential aging of screen areas. These techniques may significantly reduce the percentage of the display area for which finer level history gathering and image transformation needs to be performed. This may lower memory usage, power, and performance impact, while providing adequate accuracy needed for effective long-term mitigation of image sticking. This may be useful for products that may have a long expected life, which may also be constrained for cost and battery life.

The image transformation techniques may adjust the brightness of the image on the OLED display at the granularity that the pixel history is being tracked. For example, the entire screen brightness may be adjusted downward to match the brightness of the most damaged areas. This may lessen future damage, as well as make the damage present less apparent. Formulas that track the relative brightness of different colors of pixel on the display may be used to calculate the compensation function. The image transformation techniques may be performed at the operating system level.

The image transformation techniques may be combined with other techniques for lowering usage of pixels to lower the overall wear on an OLED display. For example, the computing system may execute applications that are OLED-aware. These applications may be allowed to move content or change the color of rendered content at the locations on the OLED display that they are assigned. One example of such an application is a screensaver, which may create or move objects unilaterally without user input. Other applications may not be able to move content, or may only have limited freedom to move content, to other locations. Thus, the use of applications that are OLED-aware may lower the amount of history for pixels, but may not be able to prevent damage to an OLED display over time.

As described herein, history data for content that has been displayed in the OLED display screen may be tracked and maintained. Using the techniques described herein, pixels may be grouped into blocks, wherein the history of a block applies to all pixels in the block.

The history data is stored in a memory in the computing system. The history data may be maintained by a device driver for a graphic processing unit (GPU) in the computing system. In one example, the device driver may analyze the history data periodically to generate or update a damage signature that is representative of the damage that has occurred on the OLED display. In another example, the history data could also be tracked and analyzed within the Operating System (OS) after the composition has occurred, without the GPU driver being aware this is occurring. In yet another example, this could also be implemented in a 'filter driver' that intercepts the frames being output by the OS to the GPU driver with the intent of maintaining the history data and performing this analysis. Such a filter driver would work in conjunction with the GPU driver or the OS to make the damage signature available for use.

In one example, the device driver uses the damage signature to adjust block size or granularity for the further collection of history data. Further, the damage signature may be used to adjust the intensity of pixels grouped in the blocks, for example, by the OS or a device driver. The OS, or a device driver, may also provide the damage signature to OLED-aware applications. An OLED-aware application may use the damage signature to adjust content to be displayed based on the damage signature to lower usage of pixels in some regions of the OLED display.

FIG. 1 is a block diagram of an example of a computing system displaying content based on history data. One or more applications, such as applications 1 through N, are executing in the computing system. The applications may include a mix of OLED aware applications and standard applications. These may be executed by a processing unit 100, such as a system-on-a-chip (SoC), that includes one or more cores 102, a graphics processing unit (GPU) 104, or both. The processing unit 100 may include an operating system (OS) 106, which may call various device drivers to perform the techniques described herein. The device drivers may include a pixel history generator (PHA) 108, a granularity selector (GSA) 110, and an image transformer (ITA) 112. Any of the PHA 108, GSA 110, or ITA 112 may be a part of the OS 106, as shown in this example, or may be part of a GPU device driver 114.

The PHA 108 may evaluate the pixel history of the blocks at the current block granularity level for the OLED display 113, for example, recording the pixel color, intensity, and time for each block. All pixels of a single color in a single block may be assigned the same pixel history value. The PHA 108 may store the history data 116 in a history data memory 118. As described herein, the history data 116 may include a damage signature.

The GSA 110 may evaluate each of the blocks in comparison to neighboring blocks to determine whether the block should be divided into smaller sizes. The division may be vertical or horizontal depending on whether the neighboring blocks are in a horizontal or vertical direction from the block, respectively.

The ITA 112 may then determine what adjustments need to be made, for example, by graphics hardware 120 to the value set for each of the pixels in a screen buffer 122. For example, a pixel may have a brightness range set by a single byte value of 0 to 255. Over time, the pixel may not be able to sustain the full brightness of 255, but may only be able to sustain a brightness of 250. Accordingly, other pixels of the same color in the OLED display 113 may be set to a value of 250 to ensure uniform brightness of that color across the display. An OLED display controller 124 may read the screen buffer 122 and power the pixels of the OLED display 113.

The techniques described herein are not limited to adjusting the brightness of the entire screen through the ITA 112, but may be used in concert with techniques to lower usage of individual pixels and decrease the damage. For example, an OLED-aware application 126 may use an image composer to generate content 128 for display on the OLED display 113 based on the history data 118. The device driver 114 may provide the history data 116 to the OLED-aware application 126. This may include only the portion 130 of history data 116 relevant to the application, such as the history data corresponding to the screen coordinates of a window 132 that the OLED-aware application 126 is to generate. In response to the portion 130 of history data 116, the OLED-aware application 126 generates the content 128 for display based on the history data.

Content 128 from the OLED aware application 132 and other applications 134, including both OLED aware applications and non-OLED aware applications, may be sent to graphics hardware 120 via a kernel under control of the GPU device driver 114, the OS 106, or both. The data corresponding to the content may be combined and stored in the screen buffer 122, for example, by an image composer that is part of the OS 106.

Figure 2:
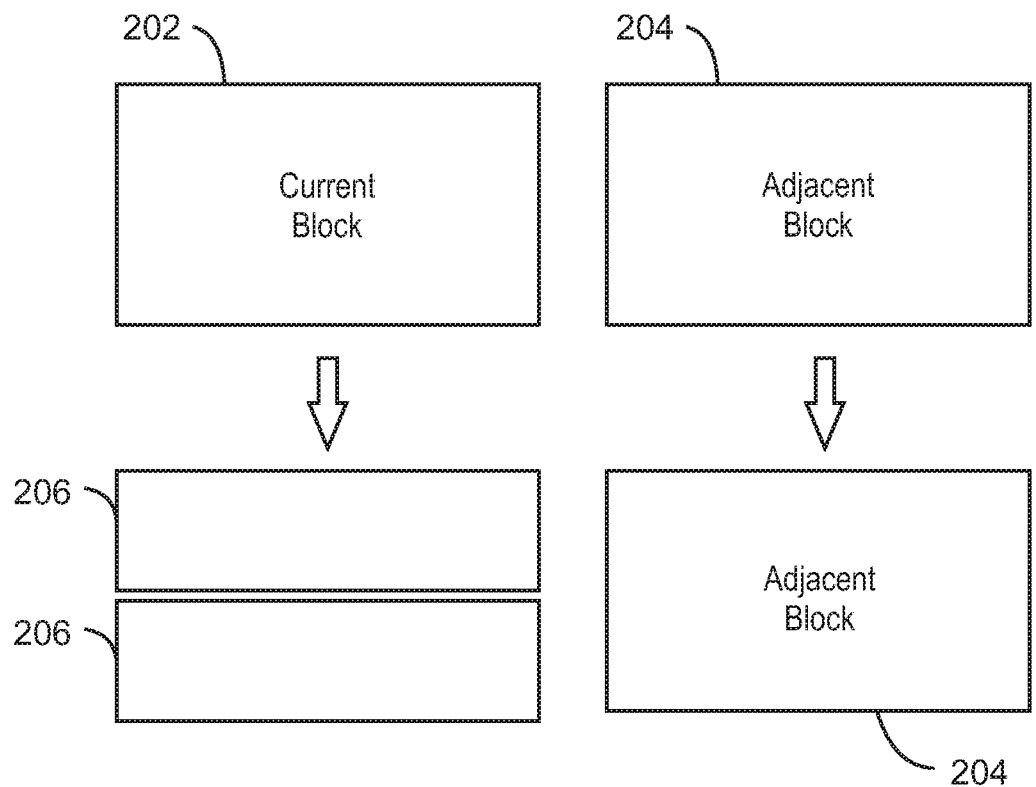
FIG. 2 is a schematic diagram showing the dividing of a block having a higher threshold value than the threshold value of neighboring blocks.

FIG. 2 is a schematic diagram showing the dividing of a block having a higher threshold value than the threshold value of neighboring blocks. The technique for avoiding stickiness may include the GSA, PHA, and ITA algorithms. FIGS. 2 to 6 present examples of the operation of the GSA. The parameters used by the GSA includes starting block size and threshold values.

Both the PHA and the ITA would start with the same block size as the one used as the starting block size in the GSA. For example, the starting block size may be N1×M1, where N1 and M1 are chosen as power-of-2 values, such that Hactive of the OLED display's native resolution is a multiple of N1 and Vactive of the OLED display's native resolution is a multiple of M1.

The GSA features thresholds both on the horizontal and vertical directions, such as Th for horizontal and Tv for vertical. The number of thresholds in the horizontal direction, NTh, may be calculated as $\log_2(N1)$. Similarly, the number of thresholds in the vertical direction NTv may be calculated as $\log_2(M1)$. In other words, the number of thresholds is the same as the number of blocks along each axis. Hence, each block has an associated threshold value for horizontal (Th) and vertical direction (Tv). The GSA chooses NTh+NTv number of thresholds for each block at the beginning. The threshold values chosen at initialization time have monotonically increasing sub-pixel values. This is to prevent a block that has been split from immediately being split again in the next iteration.

The threshold values may be sub-pixel usage values chosen by the GSA to factor into decisions that change the granularity in the horizontal or vertical directions. The threshold values may be used to indicate when a portion of the OLED display has had enough usage to consider dividing that portion into smaller portions. A usage value for a block may be determined as the driving value multiplied by time at that value and then multiplied by a color factor. The color factor may be set by a function that relates intensity for a particular color at a particular driving value, such as 0 to 255, over a usage time. The GSA allows for granularity changes to be made in each direction independent of the other. The pixel histories for all different colors within a block may be combined to create a single pixel history value.

FIG. 2 is a schematic diagram of a simplified example of splitting a current block 202 based on pixel usage within the current block 202. In FIG. 2, the current block 202 has a difference in a pixel history value from an adjacent block 204 that exceeds a horizontal threshold (Th). It may be noted that the pixel history applies to all pixels within the current block 202. The GSA may then update the block sizes by splitting the current block 202 into two sub-blocks 206 vertically. After the split, the resulting sub-blocks 206 retain the same number (NTh+NTv) of thresholds.

However, the threshold along the direction of split is updated to its next value from among the threshold values chosen at initialization time. So if the block split along vertical direction, then the vertical threshold is updated in each of the two sub-blocks.

Each of the two new blocks 206 are assigned a new threshold value (Th) from among threshold values chosen at initialization time.

The GSA splits only the current block 202 that it is evaluating. Decisions on the neighboring blocks 204 are taken at a later point in time when they are analyzed.

Figure 3:
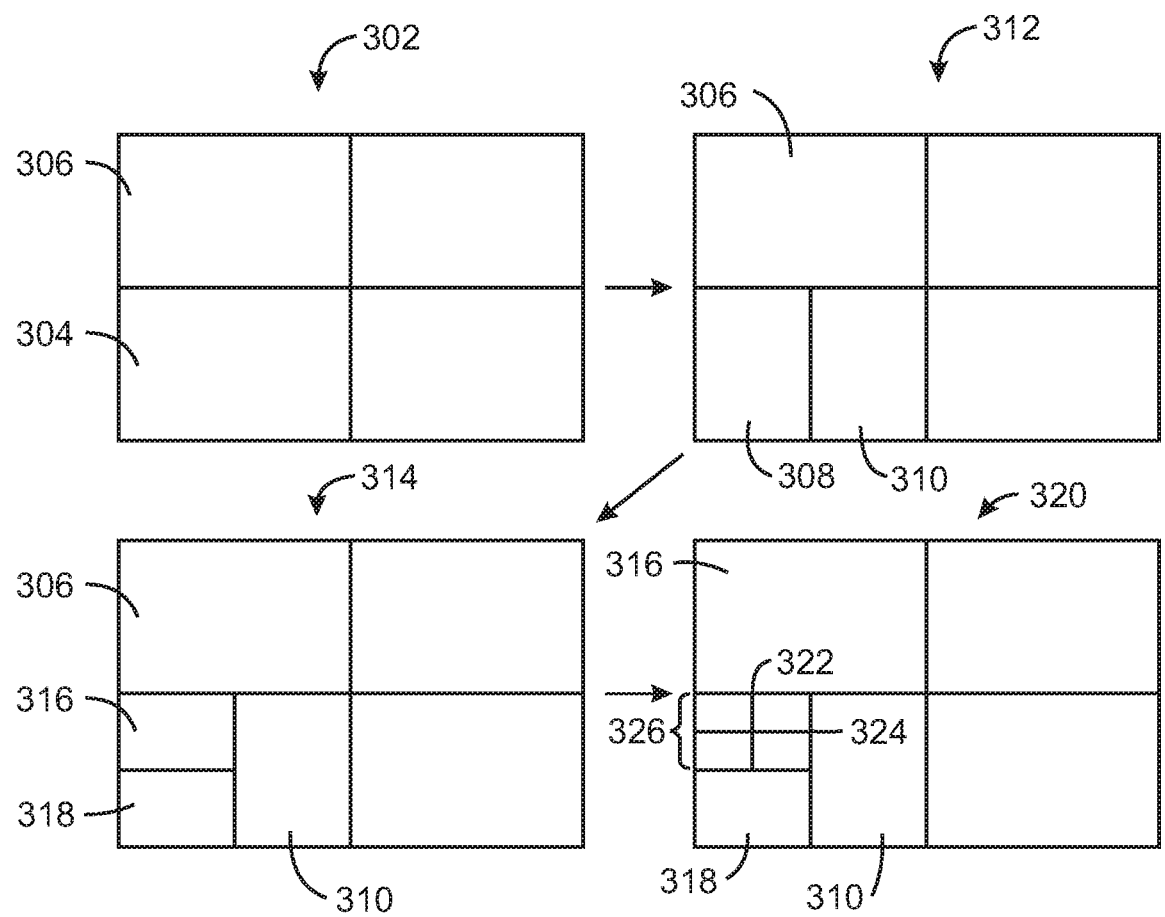
FIG. 3 is a schematic diagram showing an example of the progression of the division of blocks into smaller units as the blocks show higher threshold values than neighboring blocks.

FIG. 3 is a schematic diagram showing an example of the progression of the division of blocks into smaller units as the blocks show higher threshold values than neighboring blocks. At a first iteration 302, a block 304 is determined to have a pixel history value that exceeds a pixel history value for an adjacent vertical block 306 by a vertical threshold (Tv). Accordingly, the block 304 is divided into two vertical blocks 308 and 310 at a second iteration 312. The vertical threshold (Tv) for the adjacent vertical block 306 is retained at the initial value. However, the vertical threshold (Tv) for the two vertical blocks 308 are updated with a new, higher, vertical threshold (Tv), taken from the next value in a list of monotonically increasing vertical threshold values.

At a subsequent iteration 314, it may be determined that one of the new blocks, block 308, has a pixel history value that exceeds the pixel history value of the other new block 310 by a horizontal threshold (Th). Accordingly, block 308 may be divided into two horizontal blocks 316 and 318. Each of the two new horizontal blocks 316 and 318 may be assigned the next horizontal threshold value (Th) in the sequence.

In a further iteration 320, comparisons of the pixel history values of block 316 with the pixel history values of blocks 306 and 318 may result in a further vertical division 322 of block 316. Similarly, comparisons of pixel history values of the child blocks of block 316 in this iteration with pixel values of block 310 may result in a further horizontal division 324 resulting in a finer group of blocks 326.

Generally, the GSA splits a current block if the pixel history value is larger than the corresponding value of its neighbor by the current threshold value in that direction for the current block. In particular, it does not split the current block when the pixel history value is smaller than the corresponding value of its neighbor by the current threshold value for that direction. The likely consequence of this is that when GSA evaluates a neighboring block, it will split that one instead. This just ensures that the blocks with the highest pixel history values are being split.

Although the GSA starts with equal sized block sizes, over time, the block sizes will change with time based entirely on the pixel usage history, as illustrated in FIG. 3. This allows the GSA to balance memory, power, and performance with quality and accuracy.

It may be noted that given uneven block sizes, the GSA splits a given current block, if it has higher pixel-value than any of its adjacent blocks by the current block's threshold in that direction. Further, it is possible that a given current block gets split both in vertical and horizontal direction in a given evaluation iteration, for example, as shown in iteration 320. A given current block may be split in only one of the two directions or in neither of the two directions. The use of the GSA to create finer block sizes, for example, to protect from image sticking is illustrated further in FIG. 4.

FIG. 4 is a drawing of a display indicating blocks that have a higher risk for image sticking versus blocks that have a lower risk of image sticking. Each group of four blocks is labeled with a circled number, indicating a Zone, and low, medium (med), or high indicating a risk of image sticking, for example, due to the probability of content (lit pixels) being present in that zone long enough to cause damage (wear).

In this example, Zones 7 to 9 are most susceptible to imaging sticking, for example, due to the user interface and application use profile use profile, such as a user menu often being located in Zones 7 to 9. Zone 2 is at a medium risk and the rest of the zones, including Zones 1, 3, and 4 to 6, in the OLED display are generally at or below the average risk. The GSA starts with N1×M1 as the subpixel block sizes for all the blocks, which is also used for the PHA and the ITA.

Figure 5:
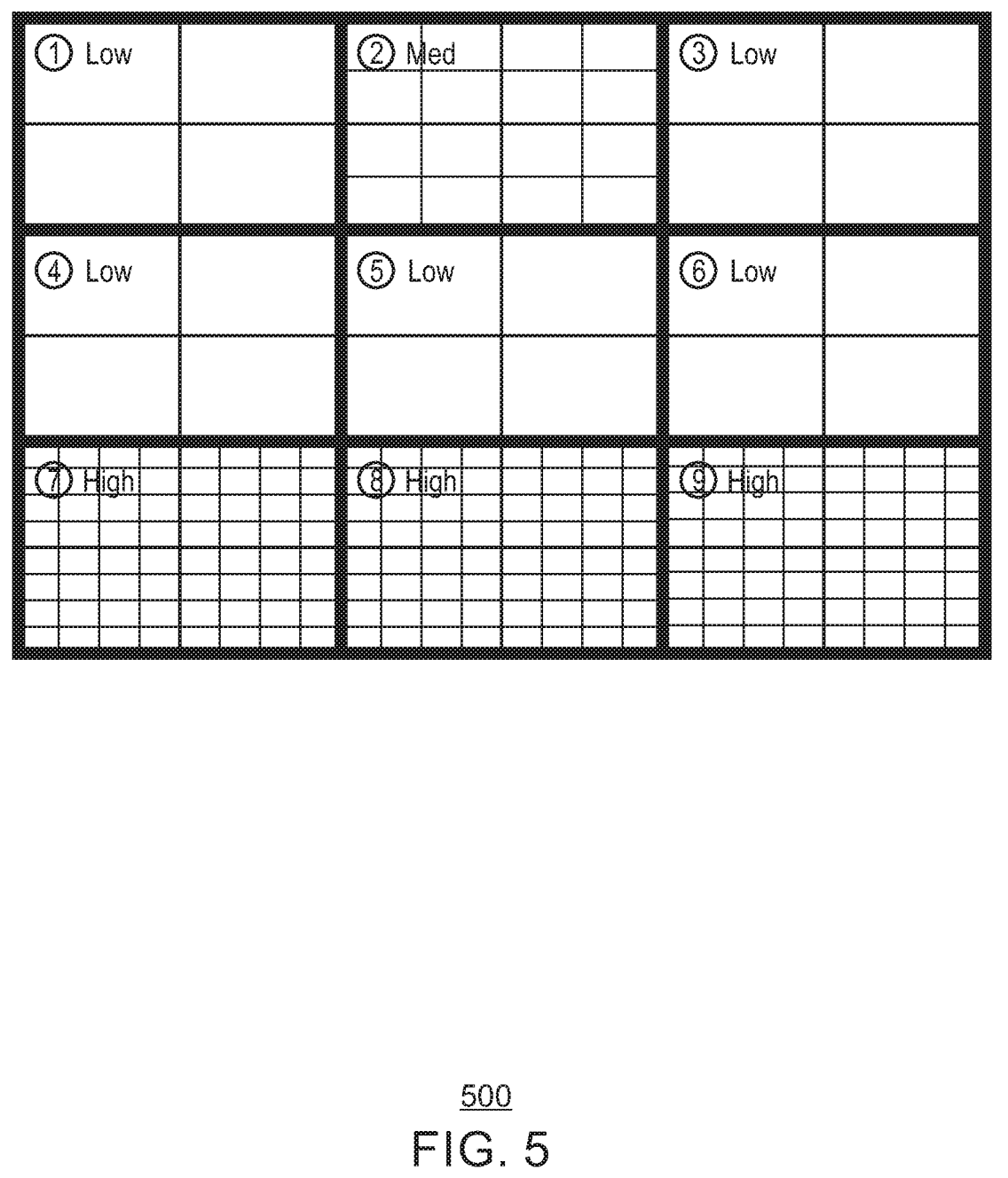

FIG. 5 is a drawing of the display of FIG. 4 that may occur after a period of operational time, showing the division of higher risk blocks into smaller blocks as history data is collected. Over the course of a number of iterations, the different usage profile in different zones on this display may create different block size distributions across the OLED display as shown in FIG. 5. The zones that have the highest pixel usage, such as Zones 7, 8, and 9 in this example, may end up with the finest granularity of block sizes. In comparison, zones with low pixel usage, such as Zones 1, 3, 4, 5, and 6 in this example, may end up with relatively high block sizes, and may even see no changes in block sizes. Zones with intermediate usage profiles, such as Zone 2 in this example, may end up with intermediate block sizes.

For much of the operational life of the OLED display this may be the block sizes used by the GSA, the PHA, and the ITA. By comparison, towards the end of the life of the OLED display, or in cases where incremental block sizes are not used, much smaller Block sizes, or even pixel sizes, may be used.

Figure 6:
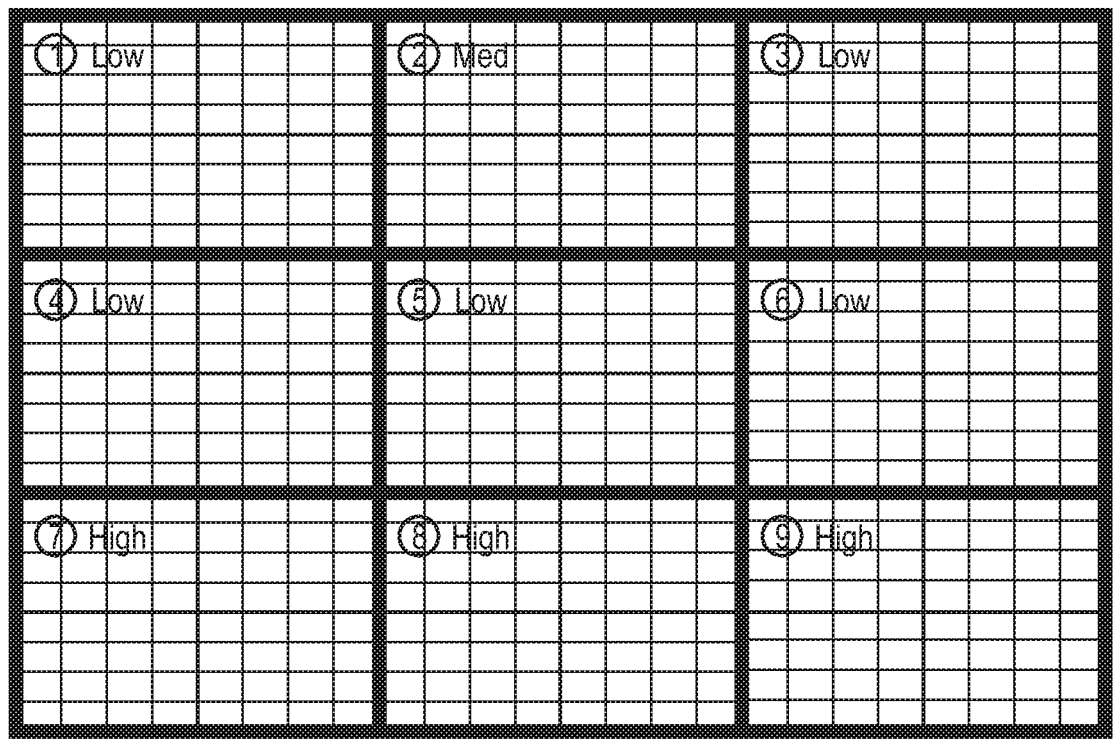
FIG. 6 is a drawing of the display of FIG. 4 showing block sizes that may occur towards the end of the lifespan of an OLED display.

FIG. 6 is a drawing of the display of FIG. 4 showing block sizes that may occur towards the end of the lifespan of an OLED display. At this point, the block sizes may each be at the sub-pixel size. This may also match scenarios where a GSA as described herein is not used. In those scenarios, the pixel sized blocks may create much higher burdens on systems. The comparison between the block sizes shown in FIG. 5, and the uniform fine-grained block distribution in FIG. 6 may provide an indicator of the memory size, power, and performance benefit that the GSA described herein provides.

As an example, an initial block size was assumed to be 8×8 sub-pixels. Over numerous iterations, the GSA may refine the block size down to individual sub-pixels for 25% of the area of the OLED display, as shown in FIG. 5, while rest of the blocks maintain the original 8×8 block size the proportional benefit may be calculated. The difference in terms of average block size ratio would be (8×8×0.75+1× 1×0.25)/(1×1) resulting in an improvement of 48.25 over performing the calculation on the individual sub-pixels. In this example, the differential aging is relatively benign. Accordingly, the ratio may be more or less depending on the usage of the OLED display.

This ratio indicates significant improvement in terms of memory size/bandwidth requirements, and also in terms of scaling down ITA processing power and performance impact on GPU/CPU, even though such scaling may not be linear. Although the GSA will refine the block size down to the fine granularity in most cases over time, for example, to the level of individual sub-pixels, during much of the life of the OLED display the savings in memory size, power, and performance loading will provide substantial benefits.

The techniques described above may be used in concert with other techniques to avoid damage to OLED displays. As described herein, these techniques may use OLED-aware applications that can use the history to determine the location of heavily used pixels and avoid those locations when generating content.

Figure 7:
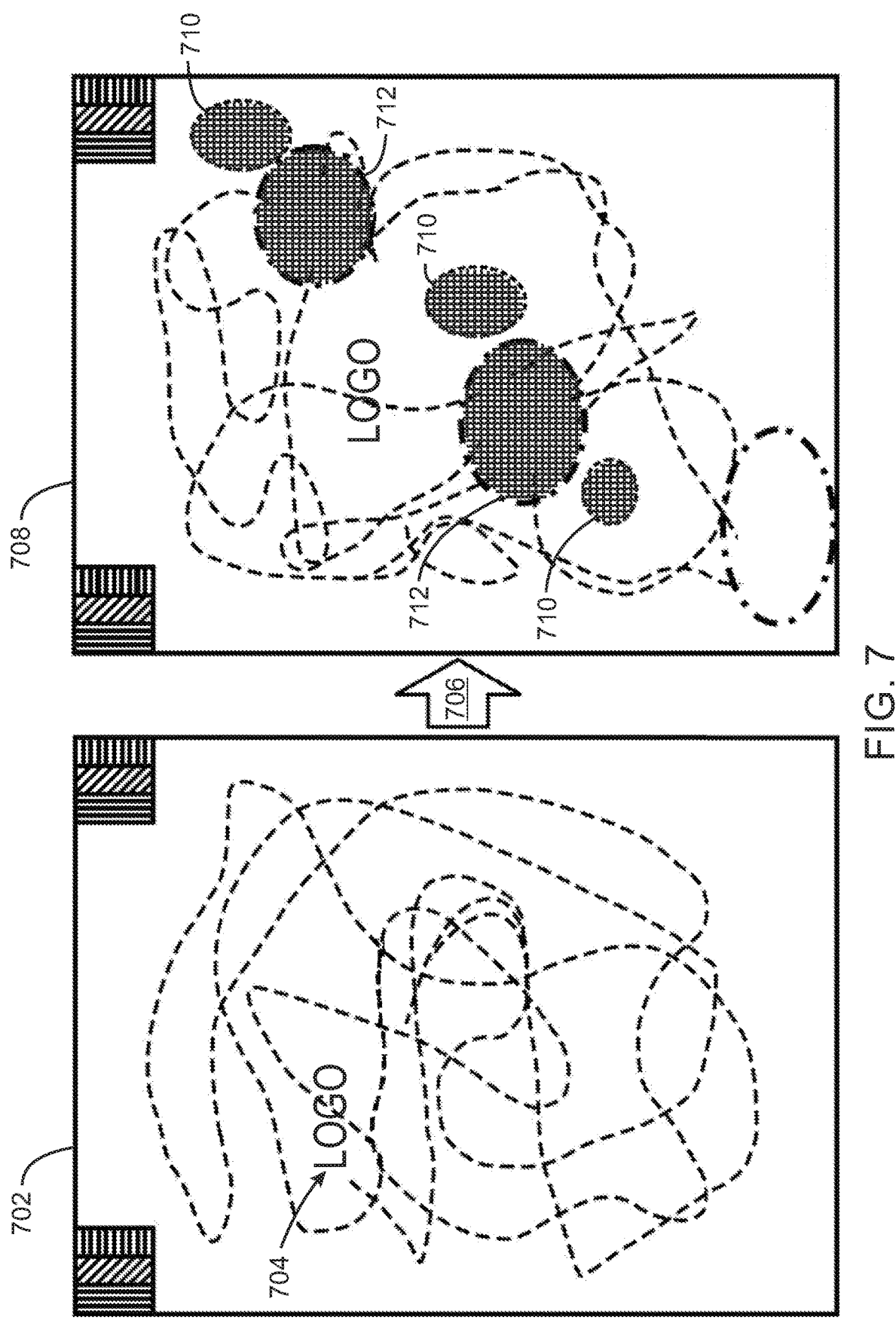
FIG. 7 is a schematic diagram of an example of the use of OLED-aware applications that manipulate content based on the history of pixel usage in order to extend the life of an OLED display.

FIG. 7 is a schematic diagram of an example of the use of OLED-aware applications that manipulate content based on the history of pixel usage in order to extend the life of an OLED display. For a new OLED display 702, a logo 704 may be moved around the new OLED display 702 without modifying the locations of the display or the colors used for the display.

As the OLED display ages 706, the OLED-aware application may use R, G, B block usage information in the damage signature to generate content for the aged OLED display 708. In the aged OLED display 708, some blocks 710 may have particularly heavy pixel usage, while in other blocks 712 may have heavy pixel usage for particular colors. It may be assumed that the GSA has divided the OLED display into very fine increments in the blocks 710 and 712 showing the damage.

Further, if the OLED-aware application determines from the history data that the blue sub-pixels in a block, such as blocks 712, are aged more than other sub-pixels in the block, then the application may generate content favoring other colors, such as red or green. In this example, the OLED-aware application may not only move the logo selectively to attempt to avoid heavily used blocks 710 and 712, but may also determine what color is to be used in those select regions/locations. For example, if the logo is normally in the color blue, the logo may be changed to the color green or the color red as it passes through the blocks 712 which have had heavy usage for the color blue.

Other techniques may be used by an OLED-aware application in addition to avoiding heavily used blocks 710 and 712, or changing the color in heavily used blocks 712. For example, an OLED-aware application may control the frequency at which it generates content to update the OLED display screen. By controlling the frequency of the updates, the frequency by which certain pixels are used may be reduced, thereby reducing the amount of damage to the pixels.

Further, as described herein, the OS may control the updating of the OLED display screen. In this example, the OS may lower the intensity of the overall display, or for the applications that are operating in response to control from the OS. Each application may have a buffer or window to generate its content that is to appear on the OLED display screen. The OS may use a list of damaged pixel locations, or an indication of the pixel usage in each such window, can control the content that placed in the frame buffer for the entire OLED display screen in order to reduce further damage or avoid damage to the OLED display. In other words, once the OS has the window data from the applications, it can compose them into the final frame buffer.

Figure 8:
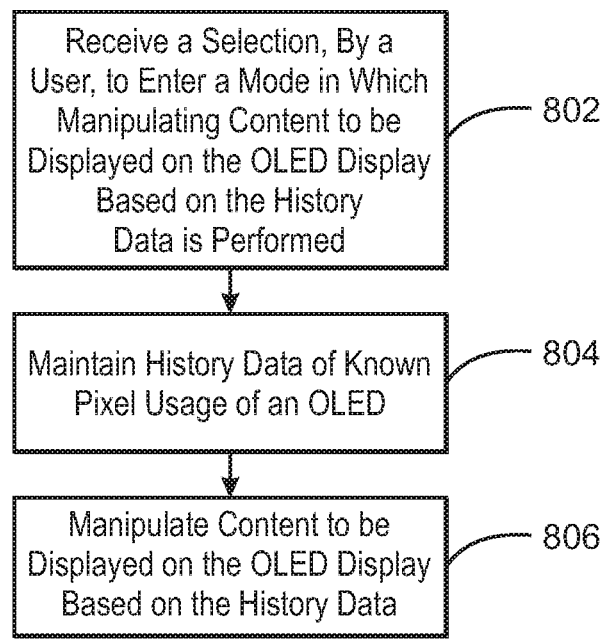
FIG. 8 is a flow diagram of one example of a method for displaying content on an OLED display.

FIG. 8 is a flow diagram of one example of a method 800 for displaying content on an OLED display. The method 800 may be performed by the systems described with respect to FIG. 1 or 11, among others. The method 800 begins at block 802, when a selection is received to enter a mode in which manipulating content to be displayed on the OLED display based on the history data is performed.

Although this may be manually entered, it may be an automatic function programmed into a computing system or OLED display that is started when the computing system or OLED display is powered.

At block 804, processing logic maintains history data of known pixel usage of an OLED display for example at the block size set by a GSA, as described herein. The history data may delineate blocks of the OLED display that have heavily used pixels, for example, generating a usage factor for each color pixel's in the block. Any number of other techniques may be used to capture the history data, for example, the history data may capture the frequency of use of particular blocks of the OLED display.

At block 806, the content sent to the screen is manipulated based, at least in part, on the pixel history. The manipulation may be perform using the ITA to lower the intensity of less used pixels to the match the intensity of more used pixels. This may lower or hide images that have been burned into the display, termed sticky images herein.

Figure 9:
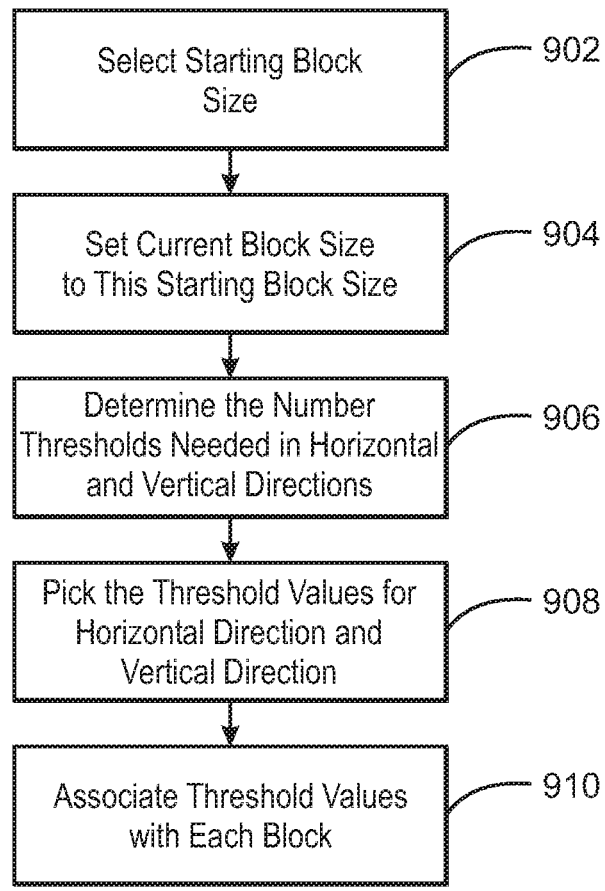
FIG. 9 is a process flow diagram of an example of a method for initializing a granular history collection for an OLED display.

FIG. 9 is a process flow diagram of an example of a method 900 for initializing a granular history collection for an OLED display. The method 900 begins at block 902, when a starting block size, for example by the GSA. The starting block size does not need to include the same number of pixels in the horizontal (N1) and vertical (M1) directions, but may be a rectangle. At block 904, the current-block-size (N×M) may be set to this starting block size (N1×M1).

At block 906 the number of thresholds needed in each of the horizontal and vertical directions is determined, for example, by the GSA. In some examples, the number of horizontal thresholds (NTh) may be the same as the number vertical thresholds (NTv). However, the number of thresholds may be different in each direction, as the initial values of NTh and NTv may be different from different counts of subpixels. For example, the initial values N1 and M1 may be powers of four, or eight, or some other number. The number of thresholds, NTh and NTv, may then be the corresponding logarithms of N1 and M1.

At block 908, the threshold values for the horizontal thresholds and the vertical thresholds are selected. For example, as described herein, this may be based on functions that define how quickly pixels of particular colors degrade in intensity over time in response to particular energization levels. Each of the threshold values monotonically increases over a last threshold value, allowing a higher value to be selected once a block has been split. At block 910, a set of threshold values in the horizontal and vertical directions are associated with each block.

Figure 10:
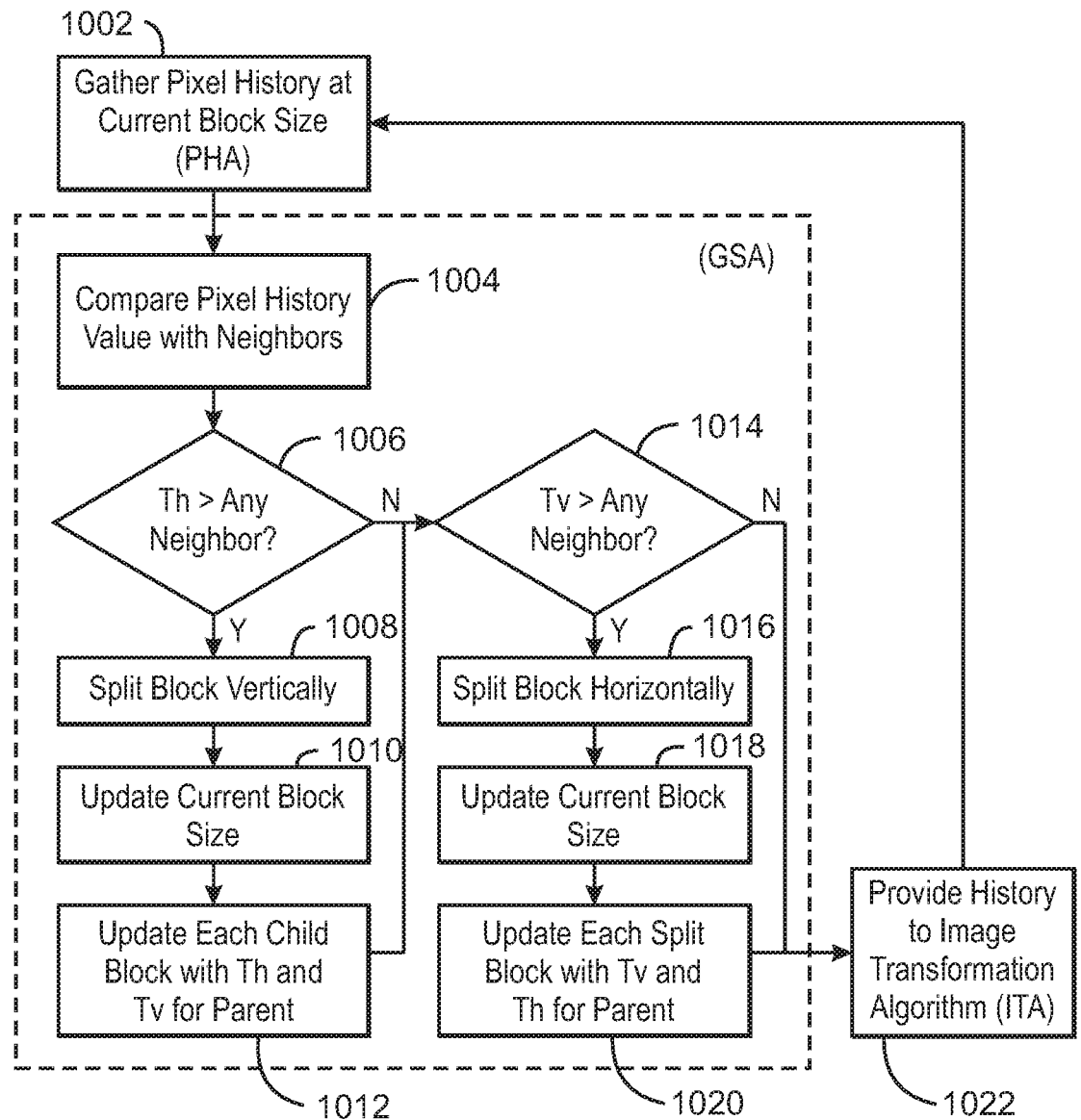
FIG. 10 is a process flow diagram of an example of a method for performing a granular history collection for an OLED display.

FIG. 10 is a process flow diagram of an example of a method 1000 for performing a granular history collection for an OLED display. The method 1000 begins at block 1002, when the pixel history is gathered at the current block size. The pixel history will be the same for all pixels within a single block.

The granularity selection algorithm (GSA) begins at block 1004, when the pixel history for a particular block is compared to the pixel history of the neighboring blocks, both vertically and horizontally. At block 1006, a determination is made as to whether a horizontal pixel history value exceeds the pixel history value for any neighboring horizontal block by the horizontal threshold. If so, at block 1008 the current block is divided vertically into two horizontal child blocks. At block 1010, the current block size is updated for each of the two horizontal child blocks. At block 1012, each of the two horizontal child blocks is updated with the next horizontal threshold value from the parent block. The next horizontal threshold value assigned to each horizontal child block is the next higher value in the monotonic series of horizontal threshold values assigned to the parent block. Further, each horizontal child block is updated with the vertical threshold value from the parent block.

If, at block 1006, it is determined that the pixel history value of the current block does not exceed any neighboring horizontal block by the horizontal threshold value, or after the block has been split into two horizontal child blocks at block 1012, process flow proceeds to block 1014. At block 1014, a determination is made as to whether the pixel history value for the block, or the two horizontal child blocks, exceeds the pixel history value for any neighboring vertical block by the vertical threshold. If so, at block 1016, the block is split into two vertical child blocks, or four vertical child blocks, if the block has already been split into two horizontal child blocks. At block 1018, the current block size is updated for each of the child blocks. At block 1020, each of the child blocks is updated with the next vertical threshold value from the parent block or blocks.

The splitting of the block in either the horizontal or vertical direction may be evenly performed, for example, N2 may be half of N1, and M2 may be half of M1. However, the splitting is not limited to even divisions or to the same numbers in each direction. For example, the blocks may be split evenly into in the horizontal direction, while the blocks are split into three parts in the vertical direction. Any number of other combinations may be used. Further, the factor by which N and M values are reduced may be dynamic, depending on the extent of difference between adjacent blocks, as determined by comparison with multiple preset thresholds.

The GSA is not limited to splitting the current block if the difference in the threshold value is higher than difference from a neighboring block. Depending on the calculation of the intensity changes, the GSA may be configured to split the current block if the pixel history value of the current block is lower than the pixel history value of a neighboring block by a threshold value.

If, at block 1014, it is determined that the pixel history value of the current block does not exceed any neighboring vertical block by the vertical threshold value, or after the block has been split into two or four vertical child blocks at block 1020, process flow proceeds to block 1022. At block 1022, the image transformation algorithm (ITA) is invoked with the current pixel history and block sizes. The ITA then mitigates any stickiness, or pixel intensity variations caused by damage, based on the current pixel history. The pixel history is also available for any OLED-aware application to use for composition of content to avoid high use or damaged areas.

Once the GSA has split a given current block, both the PHA and the ITA use the revised block size for that region of the frame. The PHA does not change the pixel history in any way after each split. In particular, the history of a parent block is not reset, but is migrated to each of the child blocks.

The method then returns to block 1002, and the steps are repeated over the entire image, until the algorithms are using a block size of one pixel for the entire screen. At that point, the GSA cannot be optimized further for memory, power, and performance. Accordingly, process flow would skip the GSA algorithm and go directly from block 1002 to block 1022.

The frequency of operation of the GSA (detailed in block 1004 through 1020) may be decoupled from the frequency at which PHA operates. Thus, the GSA may not operate every time pixel history is collected by the PHA or the ITA is operated to compensate for image stickiness, or pixel damage.

Figure 11:
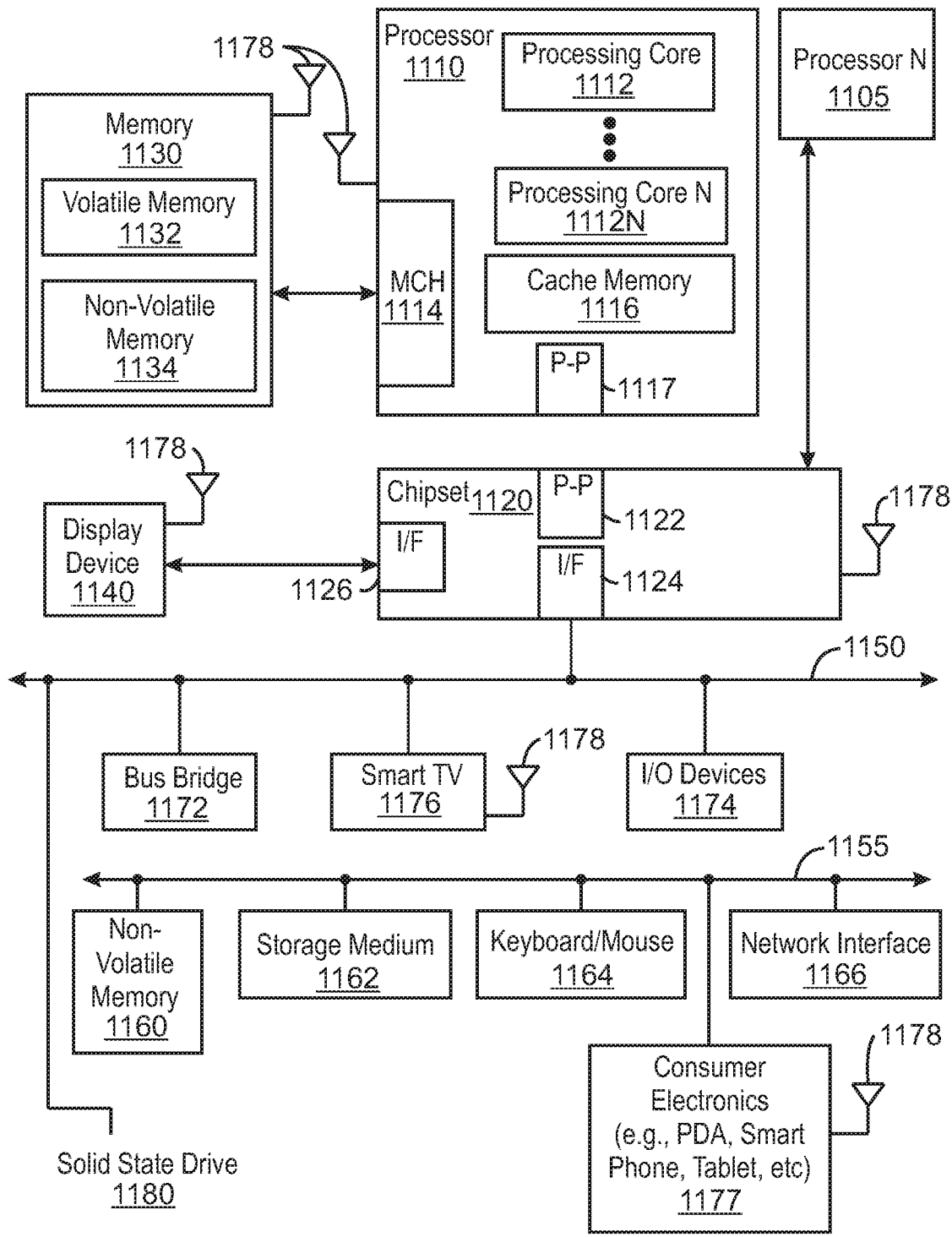
FIG. 11 is a block diagram of an example system that may incorporate the techniques described above.

FIG. 11 is a block diagram of an example system that may incorporate the techniques described above. For example, the techniques described above may be used in conjunction with a processor in system 1100 or other part of system 1100.

Referring to FIG. 11, system 1100 includes, but is not limited to, a desktop computer, a laptop computer, a netbook, a tablet, a notebook computer, a personal digital assistant (PDA), a server, a workstation, a cellular telephone, a mobile computing device, a smart phone, an Internet appliance or any other type of computing device. The system 1100 may implement the methods disclosed herein and may be a system on a chip (SOC) system.

The processor 1110 may have one or more processor cores 1112 to 1112N, where 1112N represents the Nth processor core inside the processor 1110 where N is a positive integer. The system 1100 may include multiple processors including processors 1110 and 1105, where processor 1105 has logic similar or identical to logic of processor 1110. The system 1100 may multiple processors including processors 1110 and 1105 such that processor 1105 has logic that is completely independent from the logic of processor 1110. In this example, a multi-package system 1100 may be a heterogeneous multi-package system, because the processors 1105 and 1110 have different logic units. The processing core 1112 may include, but is not limited to, pre-fetch logic to fetch instructions, decode logic to decode the instructions, execution logic to execute instructions and the like. The processor 1110 may have a cache memory 1116 to cache instructions or data of the system 1100. The cache memory 1116 may include level one, level two and level three, cache memory, or any other configuration of the cache memory within processor 1110.

The processor 1110 may include a memory control hub (MCH) 1114, which is operable to perform functions that enable processor 1110 to access and communicate with a memory 1130 that includes a volatile memory 1132 or a non-volatile memory 1134. The memory control hub (MCH) 1114 may be positioned outside of processor 1110 as an independent integrated circuit.

The processor 1110 may be operable to communicate with memory 1130 and a chipset 1120. In this example, the SSD 1180 may execute the computer-executable instructions when the SSD 1180 is powered up.

The processor 1110 may be also coupled to a wireless antenna 1178 to communicate with any device configured to transmit or receive wireless signals. A wireless antenna interface 1178 may operate in accordance with, but is not limited to, the IEEE 802.11 standard and its related family, HomePlug AV (HPAV), Ultra Wide Band (UWB), Bluetooth, WiMAX, or any form of wireless communication protocol.

The volatile memory 1132 includes, but is not limited to, Synchronous Dynamic Random Access Memory (SDRAM), Dynamic Random Access Memory (DRAM), RAMBUS Dynamic Random Access Memory (RDRAM), or any other type of random access memory device. The non-volatile memory 1134 includes, but is not limited to, flash memory (e.g., NAND, NOR), phase change memory (PCM), read-only memory (ROM), electrically erasable programmable read-only memory (EEPROM), or any other type of non-volatile memory device.

Memory 1130 is included to store information and instructions to be executed by processor 1110. This may include applications, operating systems, and device drivers. The chipset 1120 may connect with processor 1110 via Point-to-Point (PtP or P-P) interfaces 1117 and 1122. The chipset 1120 may enable processor 1110 to connect to other modules in the system 1100. The interfaces 1117 and 1122 may operate in accordance with a PtP communication protocol such as the Intel QuickPath Interconnect (QPI) or the like.

The chipset 1120 may be operable to communicate with processor 1110, 1105, display device 1140 (e.g., an OLED display), and other devices 1172, 1176, 1174, 1160, 1162, 1164, 1166, 1177, etc. The chipset 1120 may be coupled to a wireless antenna 1178 to communicate with any device configured to transmit or receive wireless signals.

The chipset 1120 may connect to a display device 1140 via an interface 1126. The display device 1140 may include, but is not limited to, liquid crystal display (LCD), plasma, cathode ray tube (CRT) display, or any other form of visual display device. In addition, the chipset 1120 may connect to one or more buses 1150 and 1155 that interconnect various modules 1174, 1160, 1162, 1164, and 1166. The buses 1150 and 1155 may be interconnected together via a bus bridge 1172, for example, if there is a mismatch in bus speed or communication protocol. The chipset 1120 couples with, but is not limited to, a non-volatile memory 1160, a mass storage device(s) 1162, a keyboard/mouse 1164, and a network interface 1166 via interface 1124, smart TV 1176, consumer electronics 1177, etc.

The mass storage device 1162 includes, but is not limited to, a solid state drive, a hard disk drive, a universal serial bus flash memory drive, or any other form of computer data storage medium. The network interface 1166 may be implemented by any type of well-known network interface standard including, but not limited to, an Ethernet interface, a universal serial bus (USB) interface, a Peripheral Component Interconnect (PCI) Express interface, a wireless interface and/or any other suitable type of interface.

While the modules shown in FIG. 11 are depicted as separate blocks within the system 1100, the functions performed by some of these blocks may be integrated within a single semiconductor circuit or may be implemented using two or more separate integrated circuits.

Figure 12:
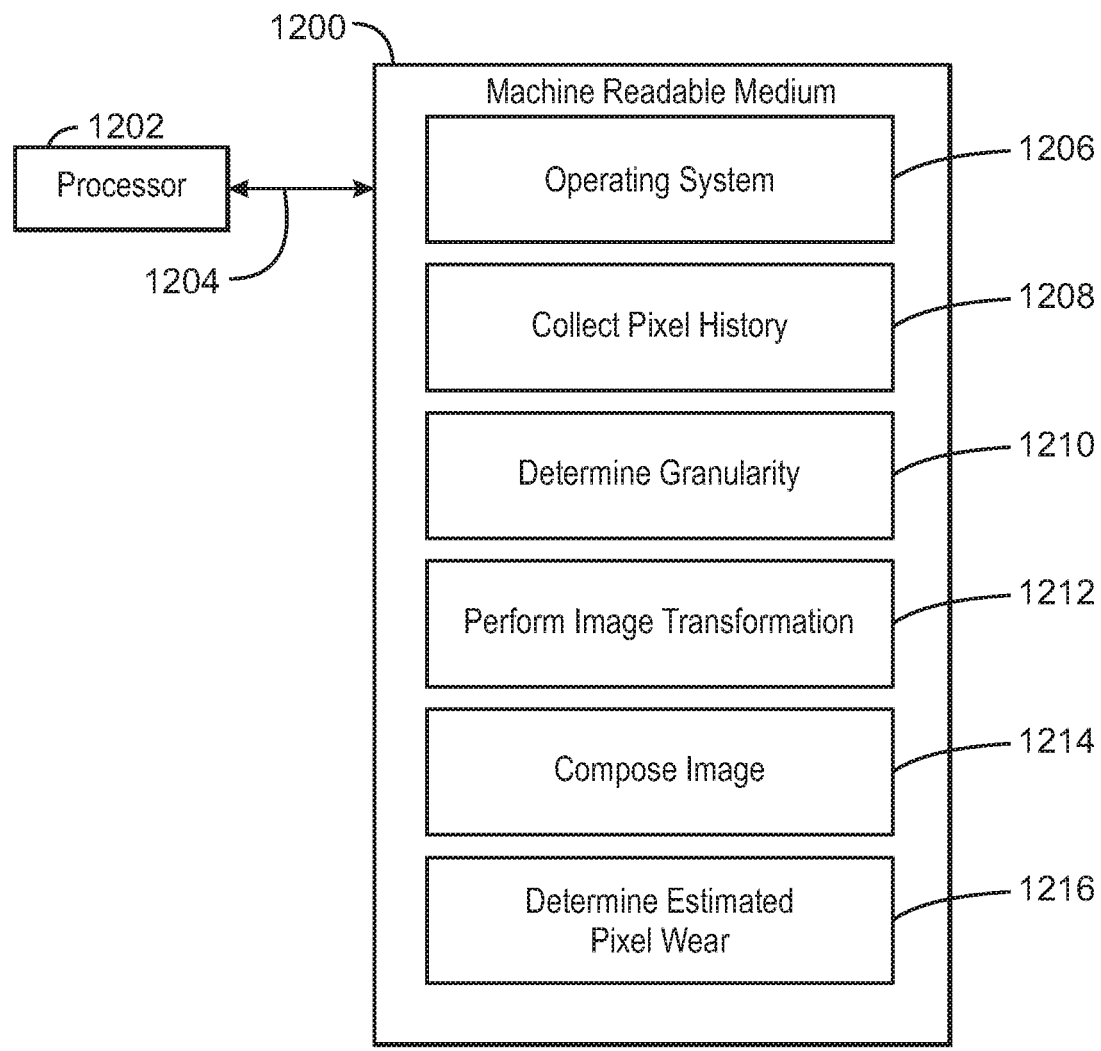
FIG. 12 is a block diagram of an example of a non-transitory, machine readable medium including code to direct a processor to participate in the off loading of computing tasks.

FIG. 12 is a block diagram of an example of a non-transitory, machine readable medium including code to direct a processor to participate in the off loading of computing tasks. The processor 1202 may access the non-transitory, machine readable medium 1200 over a bus 1204. The non-transitory, machine readable medium 1200 may include devices described for the storage medium 1162 of FIG. 11 or may include optical disks, thumb drives, or any number of other hardware devices. The non-transitory, machine readable medium 1200 may include code 1206 to direct the processor 1202 to boot an operating system.

The non-transitory, machine readable medium 1200 may include code 1206 to direct the processor 1202 to boot the system. The code 1206 may direct the processor to initialize the GSA for collecting history and making image adjustments. Code 1208 may be included to direct the processor to collect pixel history for a current block size allocation across the display. Code 1210 may be included to direct the processor to determine granularity size for blocks in and OLED display. As described herein the granularity size may be based on the pixel history values for the blocks. Code 1212 may be included to direct the processor to perform image transformations based on the pixel history collected for the blocks in the display.

The non-transitory, machine readable medium 1200 may include code 1214 to direct the processor 1202 to compose an image that avoids blocks of high pixel wear, or regions in which image sticking occurs. The code 1214 may direct the processor 1202 to change colors of information and items displayed in certain blocks to lessen the wear on certain colored pixels. Code 1216 may be included to direct the processor to determine estimated wear on pixels in blocks. The code 1216 may use functions that relate intensity degradation to time of use at average energization levels.

Example 1 includes a computing system. The computing system includes an organic light-emitting diode (OLED) display and a memory to store pixel history values for blocks of pixels in the OLED display. A granularity selector determines a size for the blocks of pixels in the OLED display.

Example 2 includes the subject matter of example 1. In example 2, the computing system includes a pixel history generator to collect the pixel history values for the blocks of pixels, wherein the pixel history values include a color function, a time of illumination, and an intensity of illumination.

Example 3 includes the subject matter of either of examples 1 or 2. In example 3, the computing system includes an image transformer to transform the image to mitigate image sticking by decreasing an intensity for less used blocks of pixels to match an intensity of more used blocks of pixels.

Example 4 includes the subject matter of any of examples 1 to 3. In example 4, the computing system includes a threshold value to determine when to split a block of pixels.

Example 5 includes the subject matter of any of examples 1 to 4. In example 5, the computing system includes an OLED-aware application to generate content for display on the OLED display based on history data.

Example 6 includes the subject matter of any of examples 1 to 5. In example 6, an OLED-aware application includes an image composer to generate content, and the image composer bases a location of the content, at least in part, on damage to the OLED display.

Example 7 includes the subject matter of any of examples 1 to 6. In example 7, the computing system includes a graphics processing unit (GPU) to generate a screen for display on the OLED display.

Example 8 includes a method for displaying content on an organic light emitting diode (OLED) display. The method includes gathering pixel history at a current block size, comparing a pixel history value for a block to that of a neighboring block, and splitting the block into child blocks based, at least in part, on whether the pixel history value differs from that of the neighboring block by more than a threshold value. An image is transformed based, at least in part, on the pixel history to decrease image sticking.

Example 9 includes the subject matter of example 8. In example 9, the method includes splitting the block into two, evenly sized, child blocks.

Example 10 includes the subject matter of either of examples 8 or 9. In example 10, the method includes splitting the block into multiple child blocks.

Example 11 includes the subject matter of any of examples 8 to 10. In example 11, the method includes splitting the block into child blocks, wherein a number of child blocks is based, at least in part, on whether the splitting is horizontal or vertical.

Example 12 includes the subject matter of any of examples 8 to 11. In example 12, the method includes comparing the pixel history value for the block to that of a horizontal neighbor, and splitting the block into horizontal child blocks if the pixel history value for the block exceeds that of the horizontal neighbor by more than a horizontal threshold value.

Example 13 includes the subject matter of any of examples 8 to 12. In example 13, the method includes updating a horizontal threshold value for each of a number of horizontal child blocks to a next higher horizontal threshold from the block.

Example 14 includes the subject matter of any of examples 8 to 13. In example 14, the method includes comparing the pixel history value for the block to that of a vertical neighbor, and splitting the block into vertical child blocks if the pixel history value for the block exceeds that of the vertical neighbor by more than a vertical threshold value.

Example 15 includes the subject matter of any of examples 8 to 14. In example 15, the method includes updating a vertical threshold value for each of a number of vertical child blocks to a next higher vertical threshold from the block.

Example 16 includes the subject matter of any of examples 8 to 15. In example 16, the method includes selecting a starting block size, setting a current block size to the starting block size, and determining a number of threshold values for each block. The threshold values are assigned to each block.

Example 17 includes the subject matter of any of examples 8 to 16. In example 17, the starting block size includes a same number of pixels in a horizontal direction as in a vertical direction.

Example 18 includes the subject matter of any of examples 8 to 17. In example 18, threshold values for each block include a monotonically increasing sequence.

Example 19 includes the subject matter of any of examples 8 to 18. In example 19, the method includes setting a same number of horizontal threshold values for each block as a number of vertical threshold values for that block.

Example 20 includes a non-transitory, machine readable medium, including instructions that, when executed, direct a processor to collect a pixel history for blocks of pixels in an organic light emitting diode display (OLED), determine a granularity for the blocks of pixels in the OLED display, and transform an image by lowering an intensity of display of blocks of pixels that have had less use to match an intensity of display of blocks of pixels that have had more use.

Example 21 includes the subject matter of example 20. In example 21, the non-transitory, machine readable medium includes instructions that, when executed, direct the processor to determine an estimate for pixel wear for a block based, at least in part, on a color of the pixels that are lighted in the block, an intensity of the of lighted pixels in the block, or a time that the pixels in the block are lighted, or any combinations thereof.

Example 22 includes the subject matter of either of examples 20 to 21. In example 22, the non-transitory, machine readable medium includes instructions that, when executed, direct the processor to compose an image to lower the use of blocks of pixels that are more damaged.

Example 23 includes a non-transitory, machine-readable medium, including instructions to direct a processor in a node to perform any one of the methods of examples 8 to 19.

Example 24 includes an apparatus, including means to perform any one of the methods of examples 8 to 19.

Example 25 includes a computing system, including an organic light-emitting diode (OLED) display, a memory to store pixel history values for blocks of pixels in the OLED display, and a means to determine a size for the blocks of pixels in the OLED display.

Example 26 includes the subject matter of example 25. In example 26, the computing system includes a means to collect a pixel history for the OLED panel.

Example 27 includes the subject matter of either of examples 25 to 26. In example 27, the computing system includes a means to transform an image to mitigate image sticking.

Example 28 includes the subject matter of any of examples 25 to 27. In example 28, the computing system includes a means to generate content to avoid heavily used blocks of pixels.

Example 29 includes the subject matter of any of examples 25 to 28. In example 29, the computing system includes a means to generate a screen for display on the OLED display.

Some embodiments may be implemented in one or a combination of hardware, firmware, and software. Some embodiments may also be implemented as instructions stored on a machine-readable medium, which may be read and executed by a computing platform to perform the operations described herein. A machine-readable medium may include any mechanism for storing or transmitting information in a form readable by a machine, e.g., a computer. For example, a machine-readable medium may include read only memory (ROM); random access memory (RAM); magnetic disk storage media; optical storage media; flash memory devices; or electrical, optical, acoustical or other form of propagated signals, e.g., carrier waves, infrared signals, digital signals, or the interfaces that transmit and/or receive signals, among others.

An embodiment is an implementation or example. Reference in the specification to "an embodiment," "one embodiment," "some embodiments," "various embodiments," or "other embodiments" means that a particular feature, structure, or characteristic described in connection with the embodiments is included in at least some embodiments, but not necessarily all embodiments, of the techniques. The various appearances of "an embodiment", "one embodiment", or "some embodiments" are not necessarily all referring to the same embodiments. Elements or aspects from an embodiment can be combined with elements or aspects of another embodiment.

Not all components, features, structures, characteristics, etc. described and illustrated herein need be included in a particular embodiment or embodiments. If the specification states a component, feature, structure, or characteristic "may", "might", "can" or "could" be included, for example, that particular component, feature, structure, or characteristic is not required to be included. If the specification or claim refers to "a" or "an" element, that does not mean there is only one of the element. If the specification or claims refer to "an additional" element, that does not preclude there being more than one of the additional element.

It is to be noted that, although some embodiments have been described in reference to particular implementations, other implementations are possible according to some embodiments. Additionally, the arrangement and/or order of circuit elements or other features illustrated in the drawings and/or described herein need not be arranged in the particular way illustrated and described. Many other arrangements are possible according to some embodiments.

In each system shown in a figure, the elements in some cases may each have a same reference number or a different reference number to suggest that the elements represented could be different and/or similar. However, an element may be flexible enough to have different implementations and work with some or all of the systems shown or described herein. The various elements shown in the figures may be the same or different. Which one is referred to as a first element and which is called a second element is arbitrary.

The techniques are not restricted to the particular details listed herein. Indeed, those skilled in the art having the benefit of this disclosure will appreciate that many other variations from the foregoing description and drawings may be made within the scope of the present techniques. Accordingly, it is the following claims including any amendments thereto that define the scope of the techniques.

The invention claimed is:

1. A computing system, comprising:
   an organic light-emitting diode (OLED) display;
   a memory to store pixel history values for blocks of pixels in the OLED display; and
   a granularity selector
      to determine a size for the blocks of pixels in the OLED display,
      to select a starting block size,
      to set a current block size to the starting block size,
      to determine a plurality of threshold values for each block,
      to assign the plurality of threshold values to each block, and
      to determine when to split a block of pixels using the plurality of threshold values;
      wherein the threshold values for each block include increasing values comprise a monotonically increasing sequence.

2. The computing system of claim 1, comprising a pixel history generator to collect the pixel history values for the blocks of pixels, wherein the pixel history values comprise a color function, a time of illumination, and an intensity of illumination.

3. The computing system of claim 1, comprising an image transformer to transform the image to mitigate image sticking by decreasing an intensity for less used blocks of pixels to match an intensity of more used blocks of pixels.

4. The computing system of claim 1, comprising an OLED-aware application to generate content for display on the OLED display based on history data.

5. The computing system of claim 4, wherein the OLED-aware application comprises an image composer to generate the content, and wherein the image composer bases a location of the content, at least in part, on damage to the OLED display.

6. The computing system of claim 1, comprising a graphics processing unit (GPU) to generate a screen for display on the OLED display.

7. A method for displaying content on an organic light emitting diode (OLED) display, comprising:
   gathering pixel history for blocks of pixels in the OLED display;
   determining a size for the blocks of pixels in the OLED display;
   selecting a starting block size;
   setting a current block size to the starting block size;
   determining a plurality of threshold values for each block, wherein the threshold values for each block comprise a monotonically increasing sequence;
   assigning the plurality of threshold values to each block;
   comparing a pixel history value for a block to that of a neighboring block;
   splitting the block into child blocks based, at least in part, on whether the pixel history value differs from that of the neighboring block by more than one threshold value of the plurality of threshold values; and
   transforming an image based, at least in part, on the pixel history.

8. The method of claim 7, comprising splitting the block into two, evenly sized, child blocks.

9. The method of claim 7, comprising splitting the block into multiple child blocks.

10. The method of claim 7, comprising splitting the block into child blocks, wherein a number of child blocks is based, at least in part, on whether the splitting is horizontal or vertical.

11. The method of claim 7, comprising:
comparing the pixel history value for the block to that of a horizontal neighbor; and
splitting the block into horizontal child blocks if the pixel history value for the block exceeds that of the horizontal neighbor by more than a horizontal threshold value.

12. The method of claim 11, comprising updating the horizontal threshold value for each of the horizontal child blocks to a next higher horizontal threshold from the block.

13. The method of claim 7, comprising:
comparing the pixel history value for the block to that of a vertical neighbor; and
splitting the block into vertical child blocks if the pixel history value for the block exceeds that of the vertical neighbor by more than a vertical threshold value.

14. The method of claim 13, comprising updating the vertical threshold value for each of the vertical child blocks to a next higher vertical threshold from the block.

15. The method of claim 7, wherein the starting block size comprises the same number of pixels in a horizontal direction as in a vertical direction.

16. The method of claim 7, comprising setting a same number of horizontal threshold values for each block as a number of vertical threshold values for that block.

17. A non-transitory, machine readable medium, comprising instructions that, when executed, direct a processor to:
collect a pixel history for blocks of pixels in an organic light emitting diode display (OLED);
determine a granularity for the blocks of pixels in the OLED display;
select a starting block size;
set a current block size to the starting block size;
determine a plurality of threshold values for each block, wherein the threshold values for each block comprise a monotonically increasing sequence;
assign the plurality of threshold values to each block;
split each block into child blocks based, at least in part, on whether the pixel history value differs from that of a neighboring block by more than one threshold value of the plurality of threshold values; and
transform an image by lowering an intensity of display of blocks of pixels that have had less use to match an intensity of display of blocks of pixels that have had more use based on the pixel history.

18. The non-transitory, machine readable medium of claim 17, comprising instructions that, when executed, direct the processor to determine an estimate for pixel wear for a block based, at least in part, on a color of the pixels that are lighted in the block, an intensity of the of lighted pixels in the block, or a time that the pixels in the block are lighted, or any combinations thereof.

19. The non-transitory, machine readable medium of claim 17, comprising instructions that, when executed, direct the processor to compose an image to lower the use of blocks of pixels that are more damaged.

* * * * *